T. M. EYNON.
PUNCTURE PROOF TIRE.
APPLICATION FILED FEB. 9, 1909.
986,049.
Patented Mar. 7, 1911.
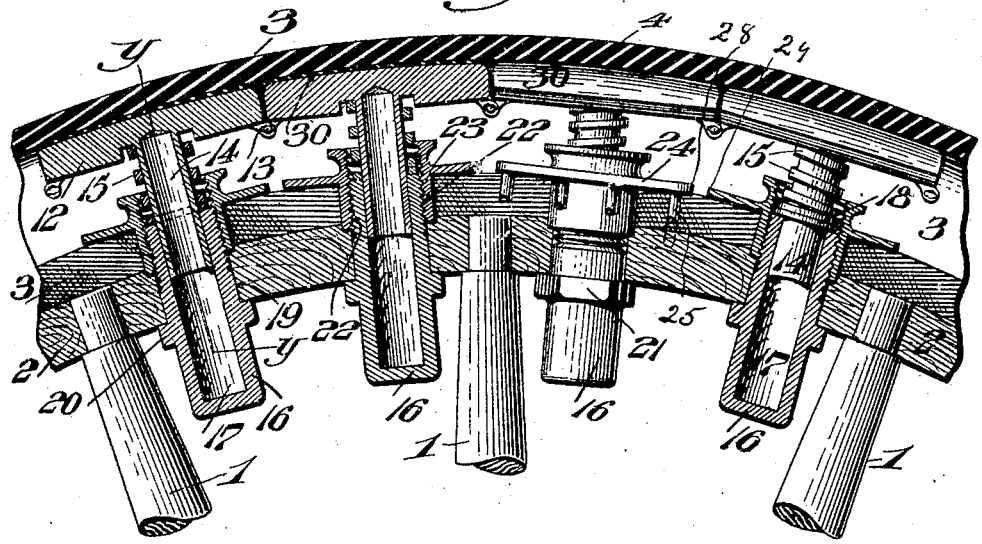
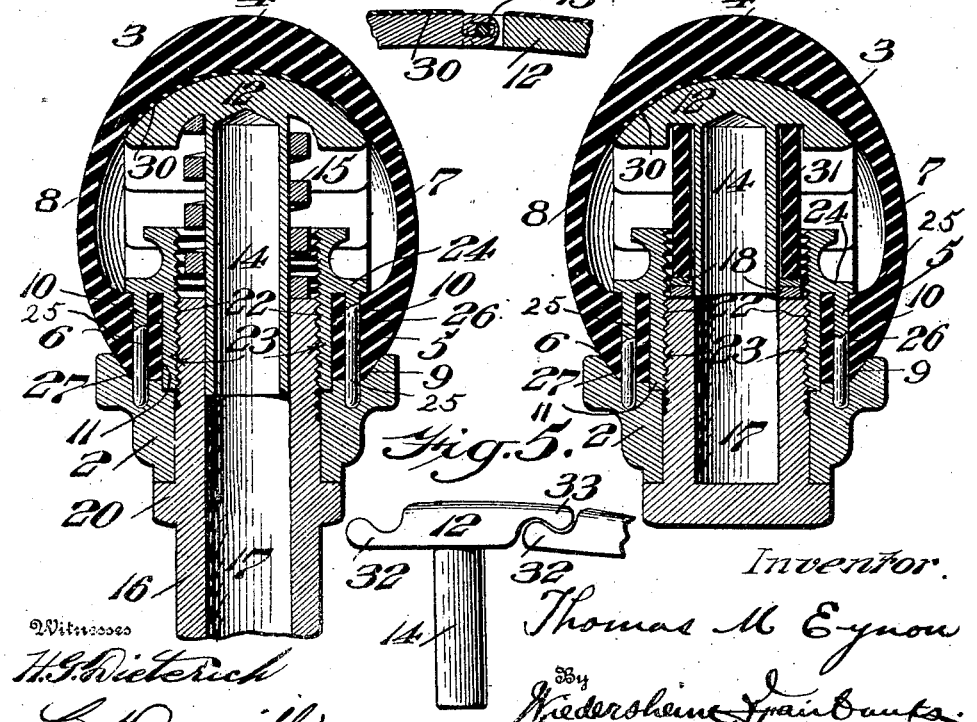

UNITED STATES PATENT OFFICE.

THOMAS M. EYNON, OF PHILADELPHIA, PENNSYLVANIA.

PUNCTURE-PROOF TIRE.

986,049.  Specification of Letters Patent.  Patented Mar. 7, 1911.

Application filed February 9, 1909. Serial No. 476,974.

*To all whom it may concern:*

Be it known that I, THOMAS M. EYNON, a citizen of the United States, residing in the city and county of Philadelphia, State of Pennsylvania, have invented a new and useful Puncture-Proof Tire, of which the following is a specification.

My invention relates to a novel construction of a puncture proof tire which is applicable to that class of wheels provided with cushioning devices for absorbing the shocks and jars incident to the movement of a vehicle over a road and the object of my invention is to provide a tire applicable to motor cars and vehicles generally, with a cushioning device which while serving every purpose of the inflated tires now generally employed in absorbing shocks and jars, shall at the same time be extremely durable in construction, sightly in appearance and comparatively cheap in its manufacture and maintenance.

To the above ends my invention consists of a novel construction of shoes which are preferably located along the inner surface of a resilient tire, said shoes being each provided with an extension projecting into a thimble which is inserted through the rim of the wheel, said thimble being held in position by a novel construction of locking nut, the latter being adapted to also hold in position, tension devices located between said thimble and shoe.

My invention further consists of a novel construction of locking nut having dowel pins projecting therefrom, which are adapted to engage the contiguous portion of the tire and the coacting rim.

My invention further consists of a novel construction of pivoted or movably connected shoes circumferentially arranged within the interior of the tire, said shoes being pressed outwardly in substantially a radial line by suitable tension devices, which are held in position by thimbles and locking or retaining nuts of novel construction.

It further consists of other novel features, of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a circumferential section of a wheel embodying my invention. Fig. 2 represents a section of the structure shown in Fig. 1 upon line *y—y* thereof. Fig. 3 represents a section corresponding to Fig. 2 of a modified form of my invention. Fig. 4 represents a broken section of a modified form. Fig. 5 represents a broken elevation of the modification.

Similar numerals of reference indicate corresponding parts in the figures.

Referring to the drawings, 1 designates any suitable number of spokes engaging the rim 2 upon which the tire 3 is supported, the latter consisting of a tread 4 and the preferably thickened portions 5 and 6 and connecting webs 7 and 8, said base portions fitting within the recess or flange 9 on each side of the rim. I have preferred to space apart the juxtaposed faces 10 and 11 of the tire by substantially the distance shown corresponding to the width of a tubular nut hereinafter referred to but this spacing may evidently be varied where desired.

I distend the tire by means of shoes 12 which are made of suitable material and preferably pivoted at 13, the distance between the shoes and the lines of the pivoting being such as to permit one shoe in this manner to draw another downwardly with it without necessitating much side movement of any of the shoes as shown with the guiding devices hereinafter specified. The slight lateral movement of the shoes toward each other by reason of their radial movement within the tire is taken care of by the spacing of the shoes, as stated, and by any required looseness of the pivotal joint. When it is remembered that these shoes are of short length and upon a radius of, for example, fifteen inches, it will be seen that little, if any, special provision for this need be made. I provide the shoes with rigid preferably hollow extensions or guides 14, and I surround this guide or extension preferably by a spiral spring or suitable resilient means 15 which rests upon the top of a tubular bolt or thimble 16 within whose bore 17 the guide 14 engages and fits. Where desired I place washers 18 beneath the spiral spring or its equivalent 15 or 31, as seen in Fig. 3, to change its degree of compression.

The shoes and their preferably rigid hollow extensions can readily be inserted within the tire after they are pivoted together by passing them through the open interior of the tire and pressing the tire outwardly enough for the inner ends of the hollow extensions to pass over the outer edge of the rim. This can readily be done before the completion of the structure because the tire upon the opposite side of the wheel will spring inwardly to sufficient extent to permit of this additional outward movement without any dependence upon the elasticity of the tire itself. The exact length of these tubular extensions would of course be suited to the character of the tire and rim which were to be used together. Another method of assemblage of these parts within the tire and upon the rim is to place the shoes with their extensions within the tire, inclining them with respect to the radius of the wheel at that point, and within a plane through the axis of the wheel, thus canting the shoes to pass their extensions over the rim and within the relatively large openings in the rim. As this is done before the tubular bolts or thimbles 16 are put in place, the openings in the rim permit considerable angular relation of the hollow extension with respect to the radius at this point.

The hollow thimble 16 is inserted within the aperture 19 in the rim 2 and its extent of movement is limited by the shoulder 20 preferably of hexagonal or other polygonal contour 21 adapted for the application of a wrench thereto. The socket is internally threaded at 22 for engagement with a nut 23 which is adapted for engagement with the tire preferably by having a rectangular plate or flange 24 and the pins 25 projecting therefrom. These pins are of any desired number and preferably lie upon the sides only where they engage within apertures 26 and 27 in the bases 5 and 6 of the tire. The extremities 28, 29 of adjoining plates or flanges may approach each other to any desired extent. I have shown the plates or flanges as flat, but they may be of any suitable shape. The tubular nut thus performs the double function of holding the tubular socket in position and of rigidly securing the base of the tire in place.

The exterior of each of the shoes 12 are preferably provided with a facing 30 for engagement with the interior of the tire for frictional purposes where needed to reduce the tendency to creep or to avoid friction.

It will thus be seen that I provide interior means of adjustment of the degree of compression, tightening means for the tire and a guiding socket and that I provide spring-distension of the shoes within the tire and guiding mechanism therefor and that I actuate adjoining shoes with each shoe in its downward movement thereby avoiding excessive independent movement of the same and bringing into play adjoining springs to support each independent spring in its action.

In Fig. 3 I have shown the same form of rim, tire, nut guide and shoe, but have made the spring support or tension device of rubber or similar resilient material 31. I also employ the washers 18 in this form which can of course be used in the construction seen in Figs. 1 and 2.

In Fig. 4, I have shown a modification of the hinging means shown in Fig. 1 wherein I provide the hinge 13' in line with the approximate centers of the adjoining shoes, and in Fig. 5, I have illustrated another hinging device, limited, however, in this case to effect one adjoining shoe only in the interlocking ears 32 and 33 which engage each other to cause the adjacent shoes to move in unison.

It will be evident that I attain complete protection against leakage of dust and dirt to the interior of the tire without sacrifice of close convenient adjustment of the parts. At the same time, repairs can be made quickly and readily on the road if necessary. All of the parts are readily accessible and the springs and other parts can be replaced either individually or in unity at any time.

Having thus described my invention, what I claim as new and desire to secure by Letters Patent, is:—

1. In a device of the character stated, a rim, a hollow thimble passing through said rim, a tire having base members, a nut retaining said thimble and the base members of said tire, a shoe within the tire, a guide projecting from said shoe into said thimble, and a shoe-supporting spring exterior to said guide.

2. In a device of the character stated, a rim, a hollow thimble passing through said rim, a tire having enlarged annular base members seated in the rim, a shouldered bolt extending through the rim and having a threaded outer end, a flanged nut upon said end and having projections upon the flanges to pass through the base members of the tire and to engage the rim, said nut clamping said base members between its flange and the rim, a shoe within the tire, and a tension member coöperating with one of the tire clamping members for forcing the shoe against the interior of the tread of the tire.

3. In a device of the character stated, a tire open upon the inside, a rim upon and within which the terminal edges of the tire are seated, a radially extending tubular bolt and nut clamping the tire against the rim, projections upon one of the tubular members passing through the tire and engaging the rim, and resilient means extending within one of the tubular members and supporting the tire.

4. In a device of the character stated, a wheel rim, a resilient tire having thickened base members seated on said rim, a hollow thimble extending through said rim, and having a polygonal shoulder thereon, adapted to abut against said rim, a nut engaging the inner threaded end of said thimble, pins in said nut extending through said tire into said rim, a shoe engaging the interior of said tire, a guide on said shoe engaging the inner bore of said thimble and a tension device intermediate said thimble and shoe.

THOMAS M. EYNON.

Witnesses:
W. S. JACKSON,
C. D. McVAY.